United States Patent
Sakatani (10) Patent No.: US 11,167,318 B2
(45) Date of Patent: Nov. 9, 2021

(54) INSPECTION APPARATUS AND METHOD OF INSPECTION

(71) Applicant: KONICA MINOLTA, INC., Tokyo (JP)

(72) Inventor: Kazuomi Sakatani, Machida (JP)

(73) Assignee: KONICA MINOLTA, INC., Tokyo (JP)

(*) Notice: Subject to any disclaimer, the term of this patent is extended or adjusted under 35 U.S.C. 154(b) by 183 days.

(21) Appl. No.: 16/667,085

(22) Filed: Oct. 29, 2019

(65) Prior Publication Data

US 2020/0171550 A1 Jun. 4, 2020

(30) Foreign Application Priority Data

Dec. 3, 2018 (JP) .............................. JP2018-226199

(51) Int. Cl.
| | |
|---|---|
| *B65H 29/62* | (2006.01) |
| *B07C 5/342* | (2006.01) |
| *B07C 5/02* | (2006.01) |
| *G01N 21/25* | (2006.01) |
| *B65H 43/04* | (2006.01) |

(52) U.S. Cl.
CPC .............. *B07C 5/3422* (2013.01); *B07C 5/02* (2013.01); *B65H 29/62* (2013.01); *B65H 43/04* (2013.01); *G01N 21/251* (2013.01)

(58) Field of Classification Search
CPC ......... B07C 5/3422; B07C 5/02; B65H 29/62; B65H 43/04; G01N 21/251; G03G 15/6538; G07D 11/17; G07D 11/235; G07D 11/30
See application file for complete search history.

(56) References Cited

U.S. PATENT DOCUMENTS

| | | | | |
|---|---|---|---|---|
| 7,422,117 | B2* | 9/2008 | Myatt ................... | G07D 11/50 209/534 |
| 8,403,148 | B2* | 3/2013 | Lubbers ................. | G07D 11/50 209/534 |
| 9,613,481 | B2* | 4/2017 | Jacomet ................. | G07D 11/30 |
| 2001/0050458 | A1* | 12/2001 | Myer, Sr. ............... | B65H 29/40 271/176 |
| 2005/0045449 | A1* | 3/2005 | Nago ....................... | G07D 7/17 194/207 |
| 2019/0163335 | A1* | 5/2019 | Kamei ..................... | H04N 1/00 |

FOREIGN PATENT DOCUMENTS

JP 2009230046 A 10/2009

* cited by examiner

*Primary Examiner* — Patrick H Mackey
(74) *Attorney, Agent, or Firm* — Buchanan Ingersoll & Rooney PC

(57) ABSTRACT

A stand-alone inspection apparatus inspects documents printed on a cut sheet, and includes: a sheet feeder capable of setting the documents in a sorted state; a sorting detector that detects the sorted state of the documents; an image reader that reads an image of the documents; an inspection part that inspects the documents on the basis of the read image; and a sheet ejector that ejects the inspected documents, wherein in a case where the documents in the sorted state are set in the sheet feeder, the sheet ejector ejects the documents in a state equivalent to the sorted state detected by the sorting detector.

16 Claims, 8 Drawing Sheets

SHEET FEEDER

SHEET EJECTOR

SHEET FEEDER SHEET EJECTOR

FIG. 6A

FIG. 6B   
INSERTION SHEET

FIG. 6C    
TAG

FIG. 6D   
INSERTION SHEET

FIG. 6E   
INSERTION SHEET

FIG. 6F    
TAG
INSERTION SHEET

FIG. 7

| FIG. 7A | FIG. 7B |
|---------|---------|

FIG. 7A

| No | SHEET FEEDING | | INSPECTION TARGET | NORMAL EJECTING OPERATION | | | | |
|---|---|---|---|---|---|---|---|---|
| | SORTING | INSERTION SHEET 1 | | INPUT MEANS | | SORTING | INSERTION SHEET 1 | INSERTION SHEET 2 (TAG 1) |
| 1 | NO | NO | ALL SHEETS | — | | NO | — | NO |
| 2 | NO | NO | ALL SHEETS | OPERATION UNIT | | NO | — | YES |
| 3 | | | | INPUT (RIP) | | | | |
| 4 | | | | OPERATION UNIT | | YES | YES | NO |
| 5 | | | | INPUT (RIP) | | | | |
| 6 | NO | YES | EXCLUDING INSERTION SHEET | OPERATION UNIT | | NO | YES | |
| 7 | | | | INPUT (RIP) | | | NO | |
| 8 | | | | DETECTION (INSERTION SHEET) | | YES | — | |
| 9 | | | | OPERATION UNIT | | | | |
| 10 | | | | INPUT (RIP) | | | | |
| 11 | | | | DETECTION (INSERTION SHEET) | | | | |
| 12 | NO | NO | ALL SHEETS | OPERATION UNIT | | NO | | YES |
| 13 | | | | INPUT (RIP) | | | | |
| 14 | | | | DETECTION (SORTING) | | | | |
| 15 | YES | | | OPERATION UNIT | | YES | | NO |
| 16 | | | | INPUT (RIP) | | | | |
| 17 | | | | DETECTION (SORTING) | | | | |

{ TO FIG. 7B

INSERTION SHEET 1: INSERTION SHEET INCLUDED IN FED DOCUMENTS IN ADVANCE
INSERTION SHEET 2 (TAG 1): INSERTION SHEET OR TAG NEWLY ADDED TO DOCUMENTS TO BE EJECTED ACCORDING TO NORMAL SHEET EJECTING OPERATION SETTING
INSERTION SHEET 3: INSERTION SHEET NEWLY ADDED TO DOCUMENTS TO BE EJECTED ACCORDING TO ABNORMALITY DETECTION RESULT

FIG. 7B

| STOPPAGE | OPERATION ON ABNORMALITY DETECTION | | | | NOTE 1 | NOTE 2 |
| --- | --- | --- | --- | --- | --- | --- |
| | EJECTION TO ANOTHER TRAY | SORTING | INSERTION SHEET 3 | TAG INSERTION 2 | | |
| ○ | ○ | ○ | ○ | ○ | · CONVENTIONAL CONFIGURATION | · STAND-ALONE INSPECTION APPARATUS ALSO HAS SORTING FUNCTION IF PRINTER MAIN BODY HAS NO SORTING FUNCTION OR SORTING FUNCTION IS NOT USED |
| ○ | ○ | ○ | △ | △ | · DETERMINE UNIT OF INSERTION OF INSERTION SHEET OR TAG DEPENDING ON INPUT MEANS | |
| ○ | ○ | × | ○ | ○ | · DETERMINE UNIT OF SORTING DEPENDING ON INPUT MEANS | · EJECT PAPER SHEET IN SAME STATE AS IN SHEET FEEDING (SAME INSERTION SHEET) |
| ○ | ○ | ○ | △ | ○ | · DETERMINE UNIT OF INSERTION OF INSERTION SHEET IN FED DOCUMENTS DEPENDING ON INPUT MEANS | |
| ○ | ○ | × | ○ | ○ | | · INSERTION SHEET CAN BE REMOVED TO BE REPLACED WITH SORTING AND INSERTION SHEET 3 CAN BE INSERTED WHEN ABNORMALITY IS DETECTED |
| ○ | ○ | ○ | △ | ○ | · DETERMINE UNIT OF SORTING IN FED DOCUMENTS DEPENDING ON INPUT MEANS | · SORTING IS NOT PERFORMED WITH SORTED DOCUMENT REPLACED WITH INSERTION SHEET |
| ○ | ○ | × | ○ | ○ | | · EJECT PAPER SHEET IN SAME STATE AS IN SHEET FEEDING |

FROM FIG. 7A

○ : AVAILABLE
△ : AVAILABLE BUT CONTENDING WITH SHEET EJECTION SETTING (USE INSERTION SHEET WITH DIFFERENT SIZE OR COLOR)
× : UNAVAILABLE

INSPECTION APPARATUS AND METHOD OF INSPECTION

The entire disclosure of Japanese patent Application No. 2018-226199, filed on Dec. 3, 2018, is incorporated herein by reference in its entirety.

BACKGROUND

Technological Field

The present invention relates to an inspection apparatus and a method of inspection, and more particularly, to an inspection apparatus that inspects sorted documents and a method of inspection in the inspection apparatus.

Description of the Related Art

In an image forming apparatus such as a multi functional peripheral (MFP), an image forming position on a paper sheet may be shifted, spot-like abnormality may occur, or a corner of a paper sheet may be bent during conveyance of the paper sheet at times. In view of the above, inspection of a paper sheet after image formation has been carried out using an inspection apparatus.

In the inspection, an image formed on the paper sheet is read and analyzed, thereby inspecting whether an image forming position is not shifted or whether abnormality is not generated, or an edge of the paper sheet is extracted, thereby inspecting whether a corner of the paper sheet is not bent.

In relation to such an inspection apparatus, for example, JP 2009-230046 A discloses an image inspection apparatus that inspects an image formed on a recording sheet on the basis of recorded information using an image forming means, the image inspection apparatus including an image reading means that reads an image of the recording sheet, an image information storing means that stores image information obtained by the image reading means reading an image and is capable of simultaneously retaining the image information of a plurality of recording sheets, a determination means that determines quality of image for each recording sheet on the basis of the image information stored in the image information storing means, a recording sheet accumulation means that terminates the image reading performed by the image reading means and is capable of accumulating a plurality of recording sheets before being subject to the quality determination performed by the determination means, a conveyance means that conveys the recording sheet output from the image forming means to the recording sheet accumulation means via the image reading means, a recording sheet sorting means that sorts the recording sheets on the basis of the determination made by the determination means, a transmission means that transmits the recording sheets one by one from the recording sheet accumulation means to the recording sheet sorting means, and a transmission control means that controls the transmission means such that the recording sheet of the image whose quality has been determined by the determination means is transmitted from the recording sheet accumulation means to the recording sheet sorting means.

As such an inspection apparatus, there are an in-line inspection apparatus incorporated in an image forming apparatus, and an off-line (stand-alone) inspection apparatus separated from the image forming apparatus.

In the in-line inspection apparatus, an output setting of an image forming apparatus main body is reflected on an inspected paper sheet. Normally, in the output setting of the image forming apparatus main body, it is possible to shift and output paper sheets in units of copies using a sort function, or to insert (insert output) an insertion sheet so that a separator of the paper sheets can be identified using a page insertion function, and according to the output setting, the inspected paper sheets can be sorted and ejected to a sheet ejector.

However, since the off-line (stand-alone) inspection apparatus is separated from the image forming apparatus, a user has been required to confirm the output setting of the image forming apparatus main body, realign the documents having been shifted and output in units of copies and set them on a sheet feeding tray of the inspection apparatus, and shift the inspected documents in units of copies to return them to the original sorted state. Furthermore, foreign matter may be mixed in a poor-quality insertion sheet in a case where an insertion sheet is also subject to inspection, and the insertion sheet itself may be determined to be a spoilage sheet (waste sheet) due to the foreign matter, whereby it has been necessary to remove the insertion sheet from the documents to set the documents on the sheet feeding tray of the inspection apparatus, and to insert the insertion sheet into the inspected documents to return the documents in the original sorted state. Alternatively, there has been no choice but to perform output without using the sort function or the page insertion function of the image forming apparatus main body.

SUMMARY

The present invention has been conceived in view of the problems described above, and a main object of the present invention is to provide a stand-alone inspection apparatus and a method of inspection capable of feeding documents in a sorted state and ejecting them in an equivalent state.

To achieve the abovementioned object, according to an aspect of the present invention, there is provided a stand-alone inspection apparatus that inspects documents printed on a cut sheet, and the inspection apparatus reflecting one aspect of the present invention comprises: a sheet feeder capable of setting the documents in a sorted state; a sorting detector that detects the sorted state of the documents; an image reader that reads an image of the documents; an inspection part that inspects the documents on the basis of the read image; and a sheet ejector that ejects the inspected documents, wherein in a case where the documents in the soiled state are set in the sheet feeder, the sheet ejector ejects the documents in a state equivalent to the sorted state detected by the sorting detector.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

As described in the related art, since an image forming position on a paper sheet may be shifted, spot-like abnormality may occur, or a corner of a paper sheet may be bent during conveyance of the paper sheet at times in an image forming apparatus, an image formed on the paper sheet is read and analyzed using an inspection apparatus, thereby inspecting whether the image forming position is not shifted, or an edge of the paper sheet is extracted, thereby inspecting whether the corner of the paper sheet is not bent.

As such an inspection apparatus, there are an in-line inspection apparatus incorporated in an image forming apparatus, and an off-line (stand-alone) inspection apparatus separated from the image forming apparatus. In the in-line inspection apparatus, it is possible to shift and output inspected paper sheets in units of copies while reflecting an output setting of an image forming apparatus main body, or to insert an insertion sheet into the inspected paper sheets, thereby ejecting the paper sheets to a sheet ejector in a sorted state.

However, in the off-line (stand-alone) inspection apparatus, a user has been required to confirm the output setting of the image forming apparatus main body, realign the documents having been shifted and output in units of copies and set them on a sheet feeding tray of the inspection apparatus, and shift the inspected documents in units of copies to return them to the original sorted state. Further, in a case where an insertion sheet is also subject to inspection, the insertion sheet itself may be determined to be a spoilage sheet, whereby it has been necessary to remove the insertion sheet from the documents to set the documents on the sheet feeding tray of the inspection apparatus, and to insert the insertion sheet into the inspected documents to return the documents in the original sorted state. Furthermore, in order to avoid such user work, there has been no choice but to perform output without using a sort function or a page insertion function of the image forming apparatus main body.

In view of the above, according to an embodiment of the present invention, documents sorted and output by the image forming apparatus can be set on a sheet feeder of the inspection apparatus as they are to be inspected, and the inspected documents can be ejected to the sheet ejector in a state equivalent to the state set on the sheet feeder.

Specifically, a stand-alone inspection apparatus that inspects documents printed on a cut sheet is provided with a sheet feeder capable of setting the documents in a sorted state (state where paper sheets are shifted and stacked in units of copies, or state where insertion sheets are inserted between the units of copies), a sorting detector that detects the sorted state of the documents, an image reader that reads an image of the documents, an inspection part that inspects the documents on the basis of the read image, and a sheet ejector that ejects the inspected documents, and in a case where the documents in the sorted state are set in the sheet feeder, the sheet ejector ejects the documents in a state equivalent to the sorted state detected by the sorting detector (state where an effect equivalent to the sorted state at the time of sheet feeding can be obtained) (e.g., ejects the documents in a state sorted in the units same as the units of sorting at the time of sheet feeding).

As described above, since the inspected documents are ejected in a state equivalent to the output setting of the image forming apparatus main body, the user is not required to realign the documents or to remove insertion sheets from the documents at the time of setting the documents in the sheet feeder of the inspection apparatus, and the user is also not required to sift the documents ejected to the sheet ejector of the inspection apparatus in units of copies or to insert insertion sheets to return the documents to the original sorted state, whereby the output setting (sort function or page insertion function) of the image forming apparatus main body can be utilized.

EXAMPLES

Figure 1:
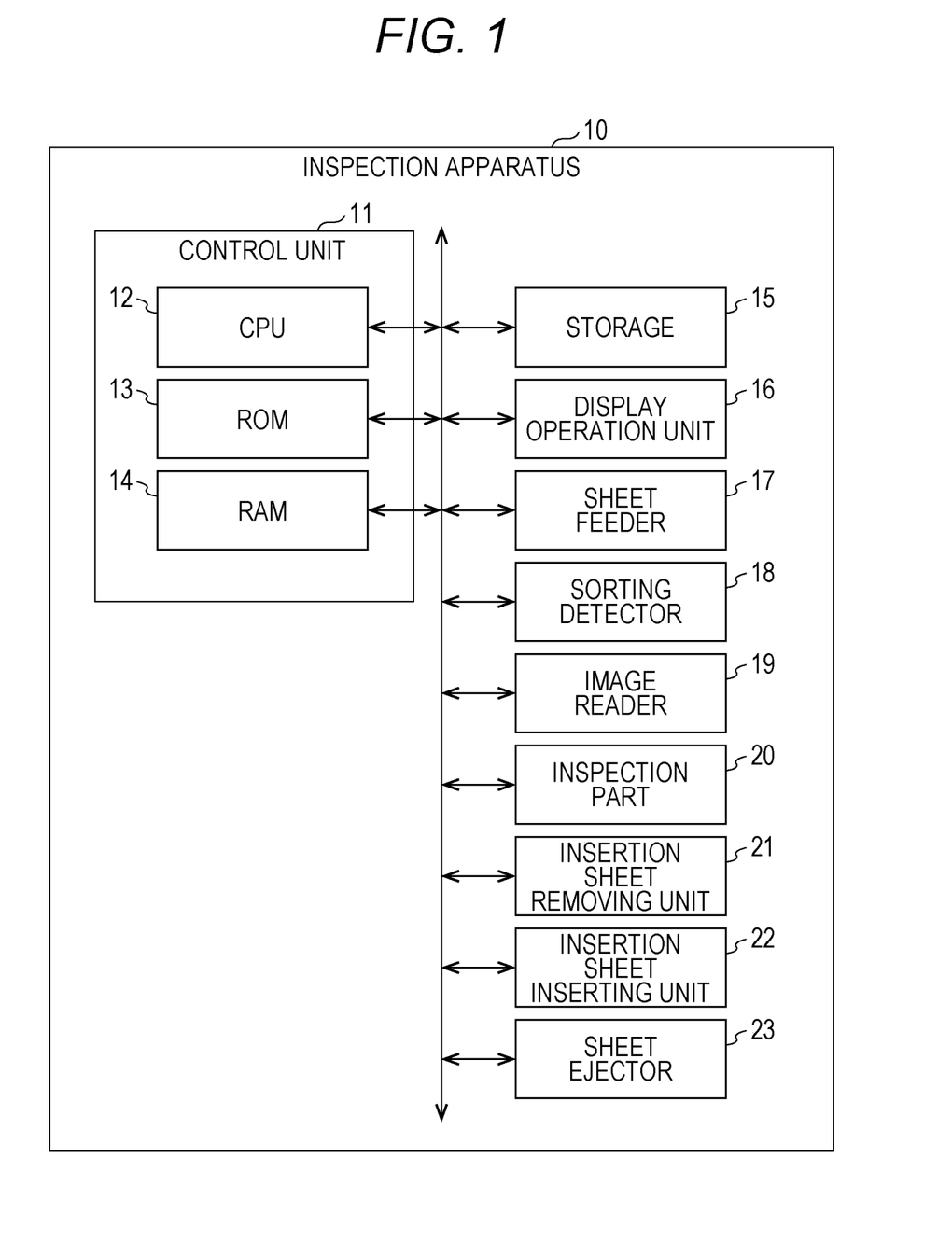
FIG. 1 is a block diagram illustrating a configuration of an inspection apparatus according to an example of the present invention.
Figure 2:
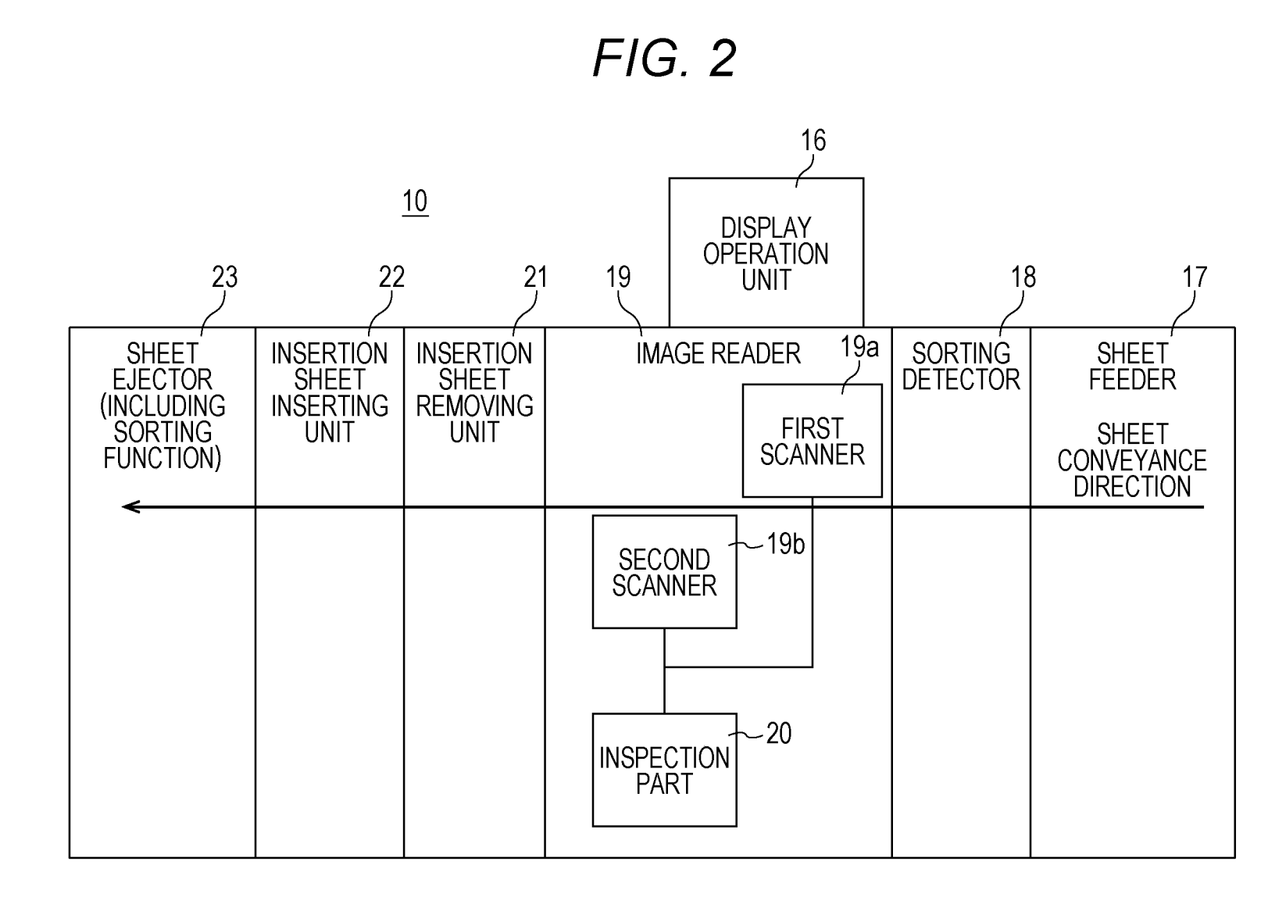
FIG. 2 is a schematic diagram illustrating an exemplary structure of an inspection apparatus according to an example of the present invention.
Figure 3:
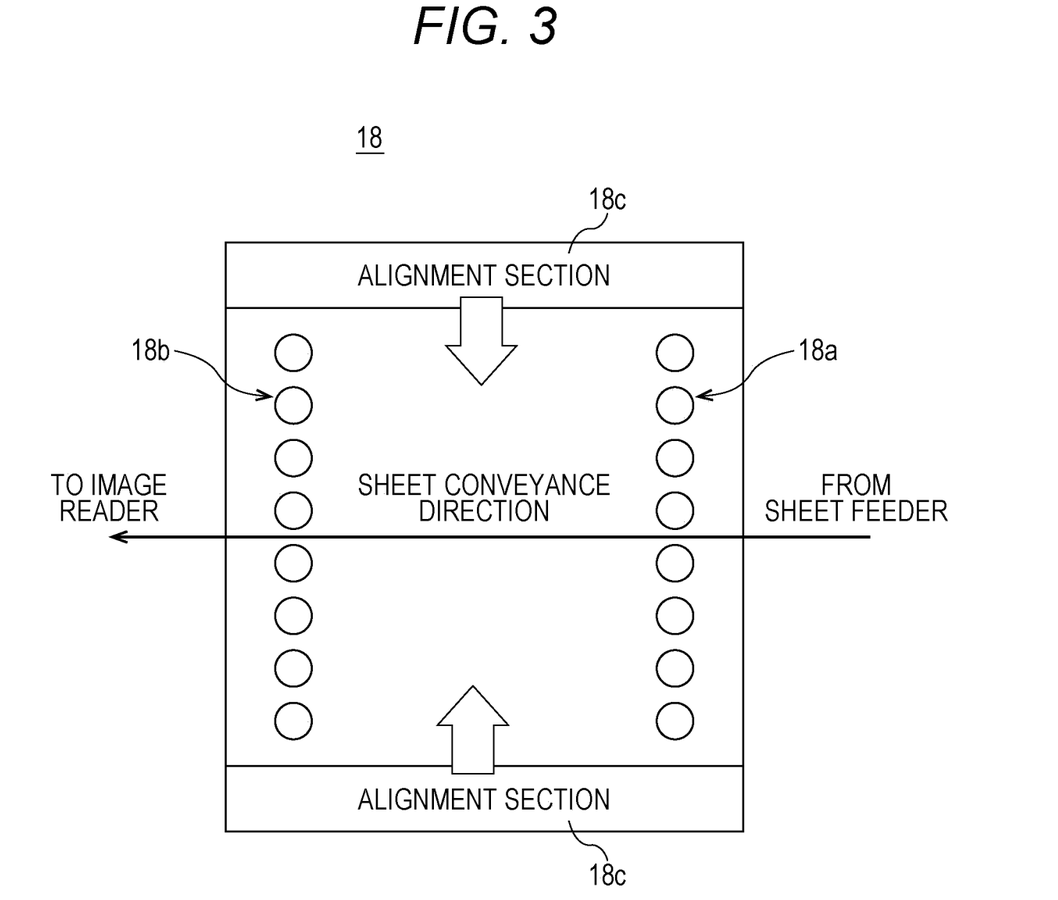
FIG. 3 is a schematic diagram illustrating an exemplary structure of a sorting detector in an inspection apparatus according to an example of the present invention.
Figure 4:
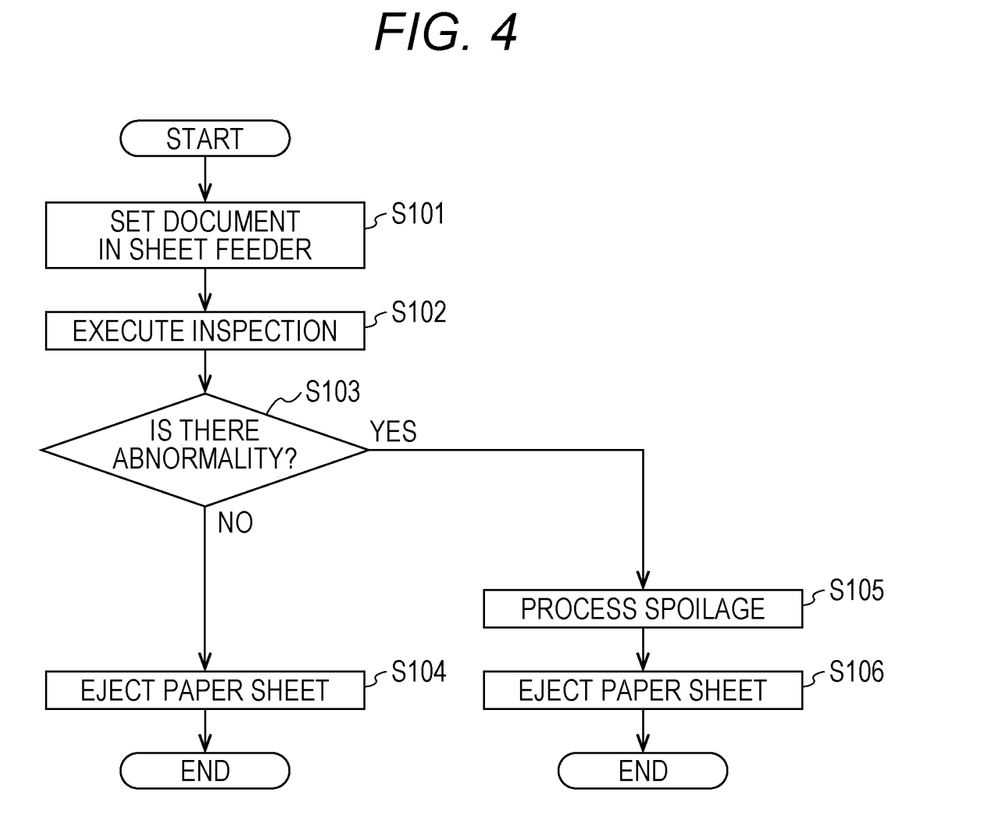
FIG. 4 is a flowchart illustrating operation of a conventional inspection apparatus.
Figure 5:
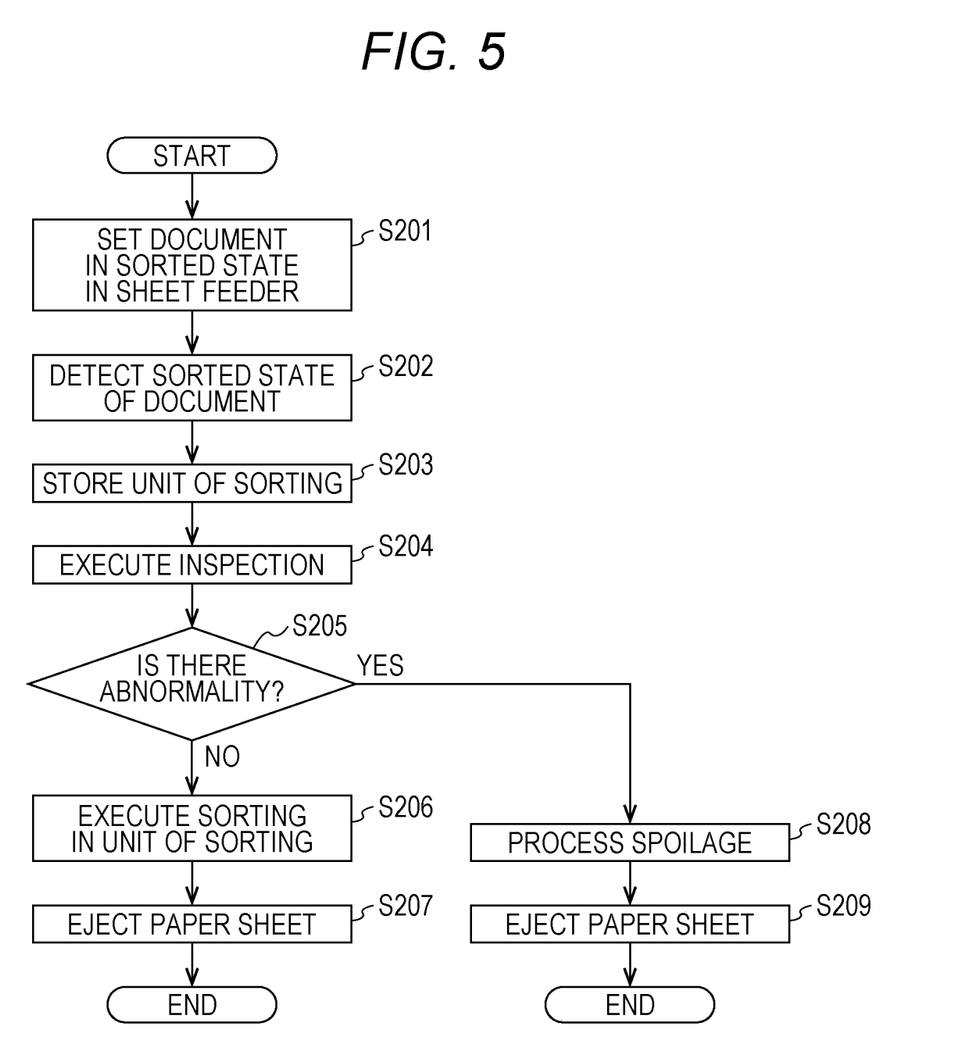
FIG. 5 is a flowchart illustrating operation of an inspection apparatus according to an example of the present invention.

In order to describe the embodiment of the present invention described above in more detail, an inspection apparatus and a method of inspection according an example of the present invention will be described with reference to FIGS. 1 to 7. FIG. 1 is a block diagram illustrating a configuration of the inspection apparatus according to the present example, FIG. 2 is a schematic diagram illustrating an exemplary structure of the inspection apparatus, and FIG. 3 is a schematic diagram illustrating an exemplary structure of a sorting detector in the inspection apparatus. FIG. 4 is a flowchart illustrating operation of a conventional inspection apparatus, and FIG. 5 is a flowchart illustrating operation of the inspection apparatus according to the present example. FIGS. 6A to 6F are schematic diagrams illustrating sorted states of paper sheets in the sheet feeder and the sheet ejector of the inspection apparatus according to the present example, and FIGS. 7A and 7B are a table illustrating combinations of sorted states at the time of sheet feeding and sorted states at the time of sheet ejection.

As illustrated in FIG. 1, an inspection apparatus 10 according to the present example includes a control unit 11, a storage 15, a display operation unit 16, a sheet feeder 17, a sorting detector 18, an image reader 19, an inspection part 20, an insertion sheet removing unit 21, an insertion sheet inserting unit 22, a sheet ejector 23, and the like.

The control unit 11 includes a central processing unit (CPU) 12, and a memory, such as a read-only memory (ROM) 13 and a random access memory (RAM) 14, which are connected via a bus. The CPU 12 reads a program front the ROM 13 or the storage 15, and loads the program in the RAM 14 to execute it, thereby performing overall control of the inspection apparatus 10.

The storage 15 includes a hard disk drive (HDD), a solid state drive (SSD), and the like, and stores the program for the CPU 12 to control each unit, image data read by the image reader 19, a unit of sorting (the number of sheets in each unit), an inspection result of the inspection part 20, image data (RIP data) generated by a raster image processor (RIP) of the image forming apparatus, which is input from the image forming apparatus, and the like.

The display operation unit 16 includes, for example, a touch panel in which a touch sensor including a lattice transparent electrode is formed on a display, such as a liquid crystal display (LCD) and an organic electro luminescence (EL) display, and functions as a display and an operation unit. The display displays various screens related to inspection. The operation unit enables various operations related to the inspection on the screens (e.g., operation for inputting a unit of document sorting, and operation for setting whether or not an insertion sheet is to be inspected). Note that the display and the operation unit may be provided as separate devices.

The sheet feeder 17 is a pail that feeds a document to be inspected, which is printed on a cut sheet (cut paper), and is capable of setting documents it) a sorted state (state in which paper sheets are shifted and stacked in units of copies, or state in which an insertion sheet is inserted between the units of copies). Specifically, a sheet feeding tray having a width wider than that in a normal case is included so that the documents shifted and stacked in units of copies can be set as they are, and a position and the number of conveying rollers are adjusted such that each of the non-aligned documents can be conveyed in the sheet conveyance direction.

The sorting detector 18 is a unit that detects a sorted state of the documents, and centers the documents (aligns the documents at the center of a sheet conveying path) as necessary. For example, as illustrated in FIG. 3, a first sheet detecting sensor 18*a* that detects a document conveyed from the sheet feeder 17, a second sheet detecting sensor 18*b* that detects a centered document, an alignment section 18*c* that aligns a document at the center of the sheet conveying path as necessary, and the like are included. By comparing a first sheet conveyance position detected by the first sheet detecting sensor 18*a* with a second sheet conveyance position detected by the second sheet detecting sensor 18*b*, it is determined whether or not the documents are output in a shifted state. Further, it is determined whether or not an insertion sheet having a size or a shape different from that of the documents is inserted on the basis of information detected by the first sheet detecting sensor 18*a* and/or the second sheet detecting sensor 18*b*. Further, in a case where the first sheet detecting sensor 18*a* and/or the second sheet detecting sensor 18*b* can distinguish a color or density of the background portion of the documents, it is determined whether or not an insertion sheet is inserted in the documents on the basis of the information detected by the first sheet detecting sensor 18*a* and/or the second sheet detecting sensor 18*b*. Furthermore, the sorting detector 18 calculates a unit of sorting (the number of sheets in each unit) on the basis of a result of the determination.

As illustrated in FIG. 2, the image reader 19 is a unit that scans the front surface and/or the back surface of the document to be inspected and reads an image of the document. For example, it includes a scanner (first scanner 19*a* and/or second scanner 19*b*) including three types of sensors of red (R), green (G), and blue (B), detects an RGB value corresponding to the amount of light reflected by the paper sheet, and outputs it as image data. Note that, although the image reader 19 has a reading width of a maximum sheet width+α (area for detecting an edge of the paper sheet), in a case where the sorting detector 18 has no function of centering the paper sheet, it is necessary to increase the reading width so that the documents output in a shifted manner can be read. In that case, there may be raised problems such as increased costs for illumination members, imaging elements, lenses, and the like, and ensuring of conveyance accuracy (straight advancing ability), and deterioration in conveyance accuracy also leads to deterioration in accuracy in detecting a spoilage sheet, whereby it is advantageous that the paper sheet is conveyed to the image reader 19 after being centered by the alignment section 18*c* of the sorting detector 18.

The inspection part 20 analyzes the image of the document read by the image reader 19, thereby inspecting whether the document is normal or abnormal. For example, a position detection mark formed at a corner of the paper sheet is read to inspect whether or not the image forming position is shifted. Further, a reference image is generated from the RIP data, and the image of the document is compared with the reference image, thereby inspecting whether or not spot-like abnormality occurs. Furthermore, an edge of the paper sheet is extracted, thereby inspecting whether or not a corner of the paper sheet is bent. Note that items of the inspection are not limited to the items mentioned above. In addition, the inspection part 20 identifies the insertion sheet on the basis of the color or the density of the background portion of the document, and excludes the insertion sheet from the inspection target.

The insertion sheet removing unit 21 is a unit that removes the insertion sheet from the documents in conjunction with the sorting function of the sheet ejector 23, which is provided as necessary. For example, the insertion sheet is removed from the documents in a case where the documents with the insertion sheet being inserted therein are set in the sheet feeder 17, and the sorted state is changed to shift the documents in units of copies or to insert a tag between the units of copies. In the case of removing the insertion sheet from the documents, the insertion sheet detected by the sorting detector 18 or the insertion sheet identified by the image reader 19 is output to a location different from that of the documents (e.g., sheet ejection tray different from the sheet ejection tray to which the inspected documents are ejected).

The insertion sheet inserting unit 22 is a unit that inserts the insertion sheet into the documents in conjunction with the sorting function of the sheet ejector 23, which is provided as necessary. For example, in a case where the documents shifted in units of copies are set in the sheet feeder 17 and the sorted state is changed, an insertion sheet or a tag is inserted between the units of copies.

The sheet ejector 23 is a part that ejects inspected documents, which has a sorting function and sorts the documents into a state equivalent to the sorted state detected by the sorting detector 18, and ejects the documents. The equivalent state is a state in which an effect equivalent to the sorted state at the time of sheet feeding in the sheet feeder 17 can be obtained, and for example, the documents are ejected in a state sorted in the units same as the units of sorting at the time of sheet feeding. That is, in a state where the documents shifted in units of copies are set in the sheet feeder 17, the documents may be ejected as they are (in a case where the documents are aligned by the sorting detector 18, in a manner shifted in units of copies similarly), or the insertion sheet inserting unit 22 may be controlled to eject the documents with an insertion sheet or a tag, being inserted between the units of copies (at the shifted part). Furthermore, in a case where the documents with an insertion sheet being inserted therein are set in the sheet feeder 17, the documents may be ejected as they are, may be ejected in a manner shifted in units of copies (at the part where the insertion sheet has beet) inserted) after the insertion sheet removing unit 2:1 is controlled to remove the insertion sheet, or may be ejected with a tag or the like being inserted between the units of copies (at the same part as the insertion sheet) by the insertion sheet inserting unit 22 being controlled after the insertion sheet removing unit 21 is controlled to remove the insertion sheet. The sorting unit mentioned above may be input from the sorting detector 18, may be input using the display operation unit 16, or may be determined on the basis of the RIP data input from the image forming apparatus.

Note that FIGS. 1 to 3 are examples of the inspection apparatus 10 according to the present example, and the configuration and control thereof can be changed, as appropriate.

For example, while the alignment section 18*c* is provided in the sorting detector 18 and the sorted state is detected by comparing the sheet conveyance position detected by the first sheet detecting sensor 18*a* with the sheet conveyance position detected by the second sheet detecting sensor 18*b* after the documents are centered by the alignment section 18*c* in FIG. 3, in a case where a sorted state can be detected using one sheet detecting sensor (a sorted state is determined on the basis of whether the documents are shifted from the center of the sheet conveying path), a unit for centering the documents (centering unit) may be provided separately from the sorting detector 18.

Furthermore, while the inspection apparatus 10 includes the insertion sheet removing unit 21 and the insertion sheet inserting unit 22 in FIG. 2, those units can be omitted in a case where the sorted state is not changed (e.g., documents with an insertion sheet being inserted therein are not ejected in a manner shifted in units of copies, and documents shifted in units of copies are not ejected with an insertion sheet or a tag being inserted therein).

Hereinafter, a method of inspection (off-hue inspection process) using the inspection apparatus 10 having the configuration described above will be described in comparison with a conventional method. FIG. 4 is a flowchart illustrating operation of a conventional inspection apparatus, and FIG. 5 is a flowchart illustrating operation of the inspection apparatus 10 according to the present example.

In the conventional off-line inspection process illustrated in FIG. 4, first, the user sets documents on the sheet feeder (S101). At this time, if the documents are shifted in units of copies, the user realigns the documents and sets them on the sheet feeder. If an insertion tire sheet is inserted in the documents, the user removes the insertion sheet and sets the documents on the sheet feeder.

Next, an image of the documents is read by the image reader or the like, and the image of the documents is analyzed by the inspection part or the like, thereby inspecting whether the image forming position is shifted, whether an abnormal portion is generated, whether a corner of a paper sheet is bent, and the like (S102).

Then, if the documents are determined to be normal as a result of the inspection (No in S103), the documents determined to be normal are ejected to the sheet ejector (S104) to terminate the inspection process, and if the documents are determined to be abnormal (Yes in S103), spoilage is processed (S105), and then the documents determined to be abnormal are ejected to the sheet ejection tray (S106) to terminate the inspection process.

In this manner, in the conventional method of inspection, even if the documents to be inspected are in a sorted state, the documents are realigned or the insertion sheet is removed therefrom to set the documents on the sheet feeder, and after the inspection, the documents are ejected as they are.

On the other hand, in an inspection process according to the present example illustrated in FIG. 5, first, the user sets the documents on the sheet feeder 17 (S201). At this time, the sheet feeder 17 according to the present example is configured in such a manner that the documents can be set in the sorted state, whereby it is unnecessary to realign the documents shifted in units of copies or to remove the insertion sheet from the documents.

Next, the sorting detector 18 detects the sorted state of the documents conveyed from the sheet feeder 17 (S202), and stores the unit of sorting (S203). For example, the documents conveyed from the sheet feeder 17 are detected by the first sheet detecting sensor 18*a* to specify the first sheet conveyance position, then the documents centered by the alignment section 18*c* are detected by the second sheet detecting sensor 18*b* to specify the second sheet conveyance position, and the first sheet conveyance position is compared with the second sheet conveyance position (or on the basis of information detected by the first sheet detecting sensor 18*a* and/or the second sheet detecting sensor 18*b*), the sorted state of the documents (e.g., whether they are shifted in units of copies, and whether an insertion sheet having a size, shape, and color or density of a background portion different from the documents is inserted) is determined, and the unit of sorting (the number of sheets in each unit) is calculated and stored in the case of being sorted.

Next, the image reader 19 reads the image of the documents conveyed from the sorting detector 18, and the inspection part 20 analyzes the image, thereby inspecting whether the image forming position is shifted, whether an abnormal portion is generated, whether a corner of a paper sheet is bent, and the like (S204).

As a result of the inspection, if the documents are determined to be normal (No in S205), the sheet ejector 23 sorts the documents determined to be normal in the unit of sorting stored in S203 (S206), ejects the documents in a state equivalent to the sorted state in the sheet feeder 17 (S207), and the inspection process is terminated.

Figure 6A:
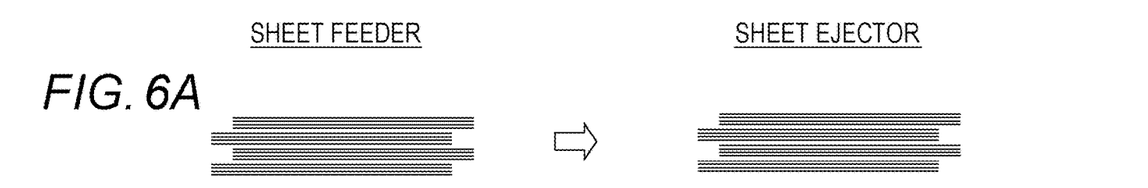
FIGS. 6A to 6F are schematic diagrams illustrating sorted states of paper sheets in a sheet feeder and a sheet ejector of an inspection apparatus according to an example of the present invention.
Figure 6B:
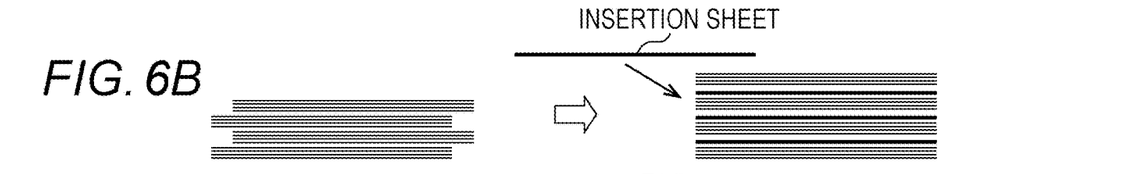
Figure 6C:
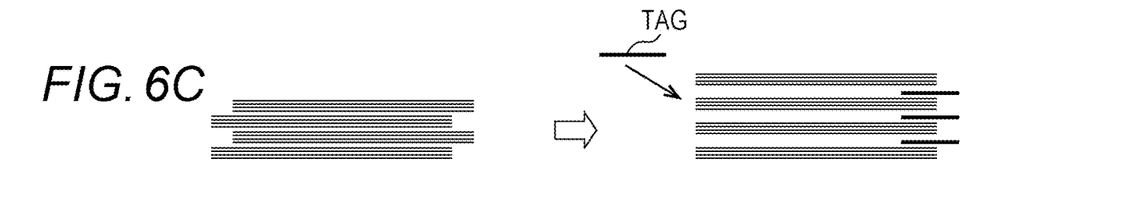
Figure 6D:
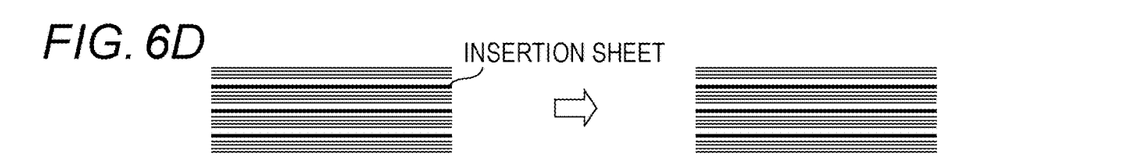
Figure 6E:
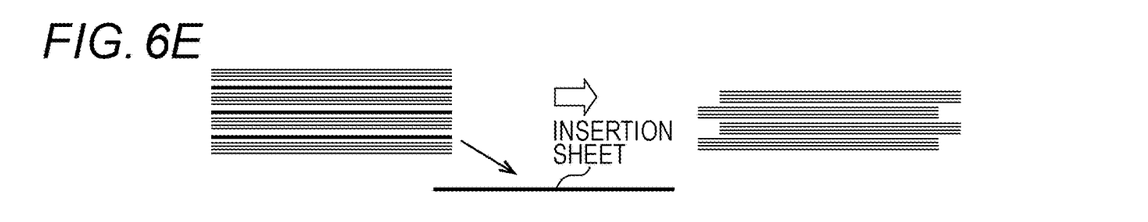
Figure 6F:
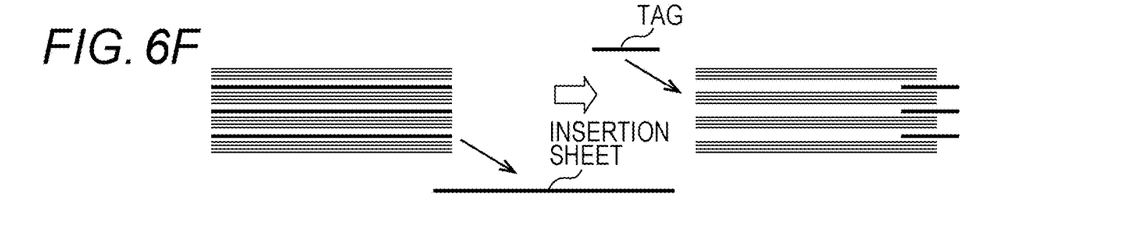
Figure 7:
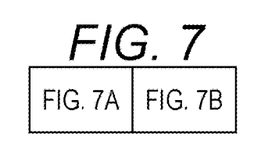
FIGS. 7A and 7B are a table illustrating combinations of sorted states at the time of sheet feeding and sorted states at the time of sheet ejection.
Figure 7A:
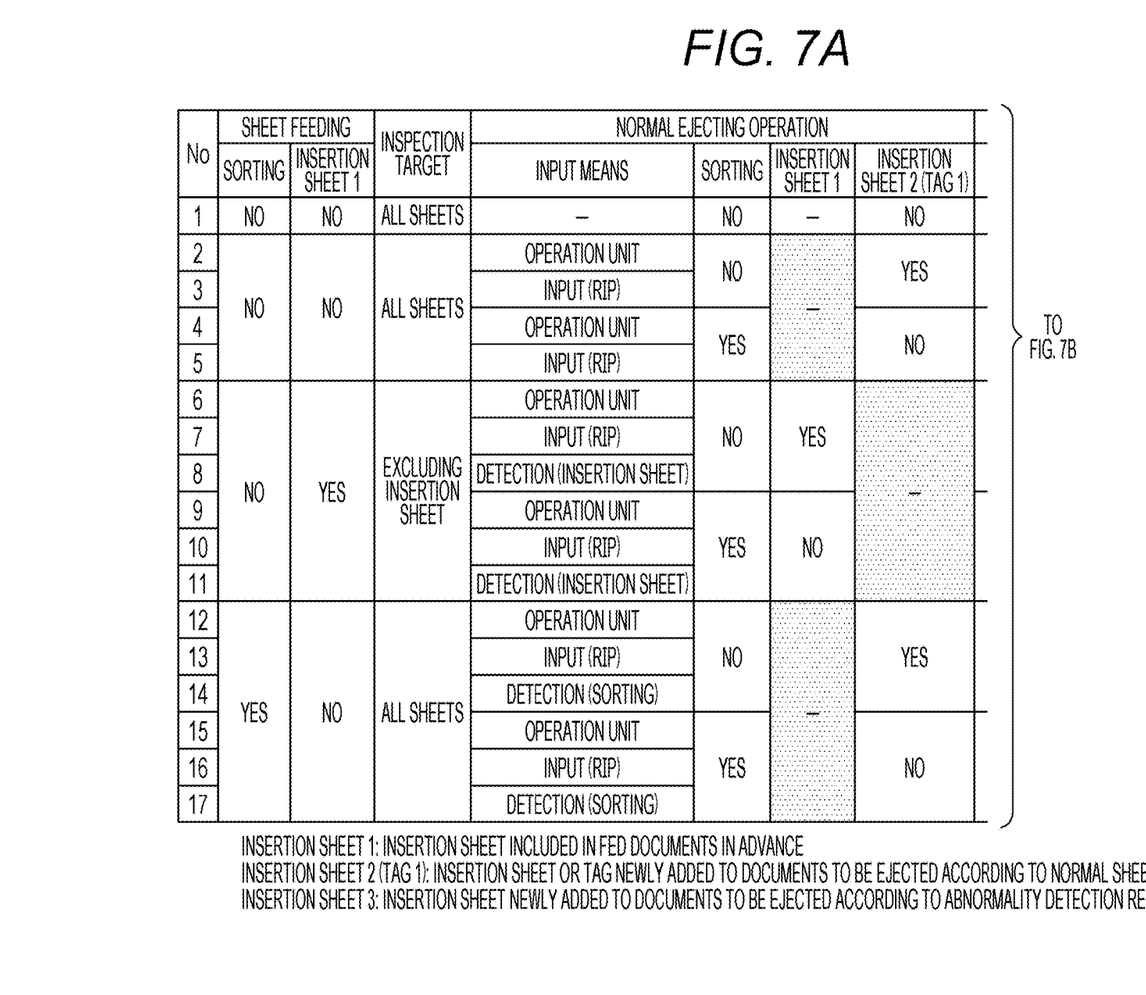
Figure 7B:
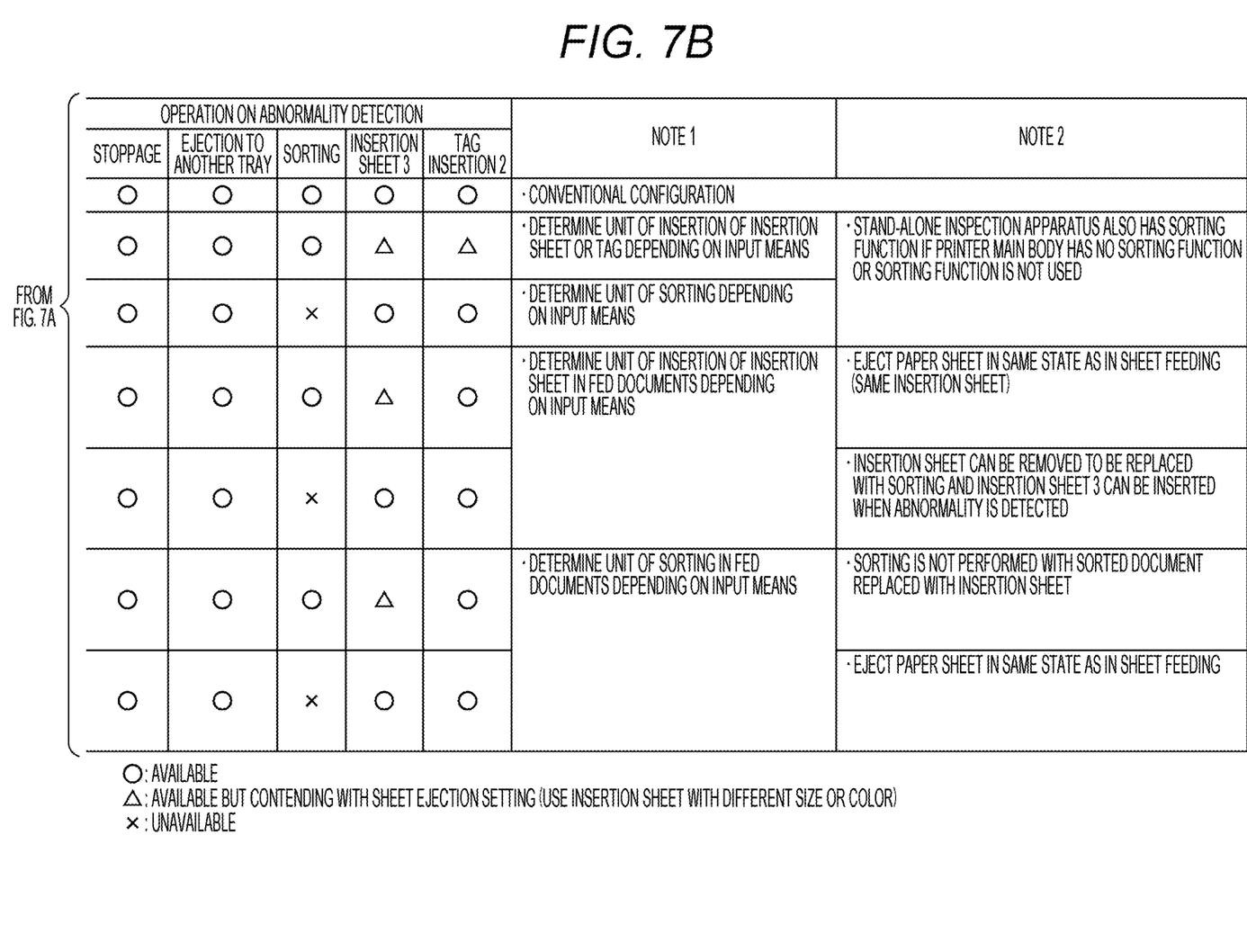

For example, in a case where the documents are set in the sheet feeder 17 in a state shifted in units of copies, while they may be ejected in a state similarly sifted in units of copies as illustrated in FIG. 6A, they may be ejected with insertion sheets (preferably insertion sheets having a color or size different from that of the insertion sheets inserted in the documents) inserted therein using tire insertion sheet inserting unit 22 as illustrated in FIG. 6B, or may be ejected with tags inserted therein using the insertion sheet inserting unit 22 as illustrated in FIG. 6C. Furthermore, in a case where the documents are set in the sheet feeder 17 in a state where insertion sheets are inserted therein, while they may be ejected in the state where the insertion sheets are inserted therein as illustrated in FIG. 6D, they may be ejected in a state shifted in units of copies after the insertion sheets are removed using the insertion sheet removing unit 21 as illustrated in FIG. 6E, or may be ejected with tags inserted therein using the insertion sheet inserting unit 22 after the insertion sheets are removed using the insertion sheet removing unit 21 as illustrated in FIG. 6F.

On the other hand, if the documents are determined to be abnormal (Yes in S205), spoilage is processed (S208), and then the sheet ejector 23 ejects the documents determined to be abnormal on the sheet ejection tray (S209) to terminate the inspection process. Note that, in the processing of spoilage in S208, the inspection is stopped, the documents determined to be abnormal are sorted, insertion sheets (preferably insertion sheets having a color or size different from that of the insertion sheets inserted in the documents) are inserted, or tags are inserted. In the ejection in S209, the documents determined to be abnormal are ejected to a tray different from the tray to which the documents determined to be normal are ejected as necessary.

FIGS. 7A and 7B are a table illustrating combinations of sorted states at the time of sheet feeding and sorted states at the time of normal sheet ejection. A "sheet feeding" column in the table indicates sorted states of documents in the sheet feeder, and an "inspection target" column indicates whether all the documents are to be inspected or the documents are to be inspected after insertion sheets are removed therefrom. A "normal sheet ejecting operation" column indicates sorted states possible for the documents determined to be normal by the inspection part 20, and an "input means" indicates input means of the number of documents (unit of sorting) to be a separator (whether it has been input from the operation unit, determined from the RIP data of the documents, or input from the sorting detector 18). An "operation on abnormality detection" column indicates processing that can be performed on the documents determined to be abnormal by the inspection part 20. Note that an insertion sheet 1 is an insertion sheet included in the documents to be fed in advance, an insertion sheet 2 (tag 1) is an insertion sheet or a tag to be newly added to the documents to be ejected according to a normal sheet ejecting operation setting, and an insertion sheet 3 is an insertion sheet to be newly added to the documents to be ejected according to an abnormality detection result. Hereinafter, descriptions will be given individually. Note that an output form of being shifted and stacked in units of copies will be simply referred to as sorting in FIGS. 7A and 7B and descriptions thereof.

No. 1 is a conventional exemplary case, and paper sheets to be inspected are documents that have not been sorted and no insertion sheet has been inserted therein (not having been subject to sorting). In the conventional exemplary case, the sheets are ejected to a normal sheet ejection tray during normal operation, and operations such as an inspection stoppage, ejection to another tray, sorting, insertion of an insertion sheet, and insertion of a tag can be selected when abnormality is detected. In the conventional exemplary case, the documents cannot be set in the sheet feeder in a sorted state, whereby the documents cannot be ejected in a state equivalent to the sorted state in the sheet feeder.

Nos. 2 to 5 are a first example, and paper sheets to be inspected are documents that have not been sorted and no insertion sheet has been inserted therein. In the first example, during the normal operation, the sheets can be ejected with the insertion sheet 2 or the tag 1 being inserted for each separator (between units of copies) as sorting for a subsequent process (Nos. 2 and 3), or can be ejected while being sorted for each separator (in units of copies) as sorting for a subsequent process (Nos. 4 and 5). That is, in a case where the image forming apparatus main body has no sorting function, or the sorting function of the image forming apparatus main body is not used, the inspection apparatus 10 also has a sorting function. Note that, in the normal sheet ejecting operation, the number of documents to be a separator (unit of sorting) can be input from the display operation unit 16 of the inspection apparatus 10, and the number of documents to be a separator can also be determined from the RIP data input from the image forming apparatus.

When abnormality is detected in Nos. 2 and 3, operations such as an inspection stoppage, ejection to another tray, and sorting can be selected, and the insertion sheet 2 or the tag 1 is inserted for each separator as the normal sheet ejecting operation, whereby the insertion sheet 3 or a tag 2 having a different size or color can be inserted. In Nos. 4 and 5, although operations such as an inspection stoppage, ejection to another tray, insertion of an insertion sheet, and insertion of a tag can be selected, the sheets are sorted for each separator as the normal sheet ejecting operation, whereby sorting cannot be selected.

Nos. 6 to 11 are a second example, and paper sheets to be inspected are documents in which the insertion sheet 1 is inserted as a separator. In this case, the insertion sheet 1 may be determined as spoilage, whereby the insertion sheet needs to be excluded from the inspection target. In the second example, during normal operation, the sheets can be ejected with the insertion sheet 1 being inserted for each separator (between units of copies) in a similar manner to the fed state (Nos. 6 to 8), or can be ejected while being sorted for each separator (in units of copies) equivalent to the fed state (Nos. 9 to 11). In the normal sheet ejecting operation, the number of documents to be a separator can be input from the display operation unit 16 of the inspection apparatus 10, the number of documents to be a separator can be determined from the RIP data input from the image forming apparatus, or the number of documents to be a separator can be input from the sorting detector 18.

When abnormality is detected, in Nos. 6 to 8, operations such as an inspection stoppage, ejection to another tray, and sorting can be selected, and the sheets are ejected with the originally inserted insertion sheet 1 being inserted for each separator as the normal sheet ejecting operation, whereby the tag 2 can be inserted, or the insertion sheet 3 having a size or color different from that of the insertion sheet 1 can be inserted. In Nos. 9 to 11, although operations such as an inspection stoppage, ejection to another tray, insertion of an insertion sheet, and insertion of a tag can be selected, the sheets are ejected in a state where the originally inserted insertion sheet 1 is removed therefrom and being sorted for each of the same separators as the normal sheet ejecting operation, whereby sorting cannot be selected.

Nos. 12 to 17 are a third example, and paper sheets to be inspected are documents sorted as a separator hi the third example, during the normal operation, the sheets can be ejected with the insertion sheet 2 or the tag 1 being inserted for each separator (between units of copies) as sorting for a subsequent process (Nos. 12 to 14), or can be ejected while being sorted for each separator (in units of copies) in a similar manner to the fed state (Nos. 15 to 17). In the normal sheet ejecting operation, in a similar manner to the descriptions above, the number of documents to be a separator can be input from the display operation unit 16 of the inspection apparatus 10, the number of documents to be a separator can be determined from the RIP data input from the image forming apparatus, or the number of documents to be a separator can be input from the sorting detector 18.

When abnormality is detected, in Nos. 12 to 14, operations such as an inspection stoppage, ejection to another tray, and sorting can be selected, and as the normal sheet ejecting operation, the sheets are ejected with the insertion sheet 2 or the tag 1 being inserted for each separator without sorting being performed as sorting for a subsequent process, whereby the insertion sheet 3 or the tag 2 having a size or color different from that of the insertion sheet 2 or the tag 1 can be inserted. In Nos. 15 to 17, although operations such as an inspection stoppage, ejection to another tray, insertion of an insertion sheet, and insertion of a tag can be selected, the sheets are ejected in the sorted state as the normal sheet ejecting operation, whereby sorting cannot be selected.

As described above, since the sorting detector 18 detects the sorted state of the documents fed to the sheet feeder 17, and the sheet ejector 23 ejects the documents in a sorted state equivalent to the state, the user is not required to realign the documents or to remove insertion sheets from the documents at the time of setting the documents in the sheet feeder 17 of the inspection apparatus 10, and the user is also not required to sift the documents ejected to the sheet ejector 23 of the inspection apparatus 10 in units of copies or to insert insertion sheets to return the documents to the original sorted state, whereby the output setting (sort function or page insertion function) of the image forming apparatus main body can be utilized.

Note that the present invention is not limited to the examples described above, and the configuration and control of the inspection apparatus 10 may be changed as appropriate without departing from the gist of the present invention.

For example, although the output form of shifting in units of copies and the output form of inserting an insertion sheet have been exemplified as sorting in the examples described above, the method of inspection according to the present invention can be similarly applied to any output form capable of making separation in units of copies.

The present invention can be used for an inspection apparatus that inspects sorted documents, and a method of inspection in the inspection apparatus.

Although embodiments of the present invention have been described and illustrated in detail, the disclosed embodiments are made for purposes of illustration and example only and not limitation. The scope of the present invention should be interpreted by terms of the appended claims.

What is claimed is:

1. A stand-alone inspection apparatus that inspects documents printed on a cut sheet, the inspection apparatus comprising:
    a sheet feeder in which a set of sorted documents can be set;
    a sorting detector that detects whether the documents set in the sheet feeder are sorted, and when the sorting detector detects that the documents are sorted, the sorting detector determines a sorting state of the documents;
    an image reader that reads an image of the documents;
    an inspection part that inspects the documents on the basis of the read image; and
    a sheet ejector is configured to eject the inspected documents, wherein
    in a case where the documents in the sheet feeder are sorted, the sheet ejector ejects the documents in a sorted state based on the sorting state detected by the sorting detector.

2. The inspection apparatus according to claim 1, wherein the sorted state is a state in which paper sheets are shifted and stacked in units of copies, or a state in which an insertion sheet is inserted between the units of copies.

3. The inspection apparatus according to claim 1, wherein the sheet ejector ejects the documents in a state sorted in a unit same as a unit of sorting at the time of sheet feeding.

4. The inspection apparatus according to claim 1, wherein the sorting detector includes a centering unit that aligns the documents conveyed from the sheet feeder at a center of a sheet conveying path.

5. The inspection apparatus according to claim 4, wherein the sorting detector includes a first sheet detecting sensor that detects the documents conveyed from the sheet feeder, and a second sheet detecting sensor that detects the documents aligned by the centering unit, and a first sheet conveyance position detected by the first sheet detecting sensor is compared with a second sheet conveyance position detected by the second sheet detecting sensor to determine the sorted state.

6. The inspection apparatus according to claim 1, wherein the inspection part identifies an insertion sheet on the basis of a color or density of a background portion of the documents, and excludes the insertion sheet from an inspection target.

7. The inspection apparatus according to claim 1, wherein the sheet ejector ejects the documents in the sorted state based on the sorting state detected by the sorting detector in a case where the inspection part has determined to be normal, and ejects the documents in a state different from the sorting state in a case where the inspection part has determined to be abnormal.

8. The inspection apparatus according to claim 1, wherein the sorted state is a state in which paper sheets are shifted and stacked in units of copies.

9. A method of inspection in a stand-alone inspection apparatus that inspects documents printed on a cut sheet, the method to execute:
    setting the documents in a sheet feeder in which a set of sorted documents can be set;
    detecting whether the documents set in the sheet feeder are sorted, and when the sorting detector detects that the documents are sorted, the sorting detector determines a sorting state of the documents;
    reading an image of the documents;
    inspecting the documents on the basis of the read image; and
    ejecting the inspected documents to an sheet ejector, wherein
    in the ejecting, in a case where the documents in the sheet feeder are sorted, the documents are ejected to the sheet ejector in a sorted state based on the sorting state detected in the detecting.

10. The method of inspection according to claim 9, wherein
    the sorted state is a state in which paper sheets are shifted and stacked in units of copies, or a state in which an insertion sheet is inserted between the units of copies.

11. The method of inspection according to claim 9, wherein
    in the ejecting, the documents are ejected in a state sorted in a unit same as a unit of sorting at the time of sheet feeding.

12. The method of inspection according to claim 9, wherein
    in the detecting, centering is performed to align the documents conveyed from the sheet feeder at a center of a sheet conveying path.

13. The method of inspection according to claim 12, wherein
    in the detecting, a first sheet conveyance position of the documents conveyed from the sheet feeder is detected using a first sheet detecting sensor disposed on an upstream side of the sheet conveying path, a second sheet conveyance position of the centered documents is detected using a second sheet detecting sensor disposed on a downstream side of the sheet conveying path, and the first sheet conveyance position is compared with the second sheet conveyance position to determine the sorted state.

14. The method of inspection according to claim 9, wherein
   in the inspecting, an insertion sheet is identified on the basis of a color or density of a background portion of the documents, and the insertion sheet is excluded from an inspection target.

15. The method of inspection according to claim 9, wherein
   in the ejecting, the documents are ejected in the state equivalent to the sorted state detected in the detecting in a case of being determined to be normal in the inspecting, and are ejected in a state different from the sorted state in a case of being determined to be abnormal in the inspecting.

16. The method of inspection according to claim 9, wherein
   the sorted state is a state in which paper sheets are shifted and stacked in units of copies.

\* \* \* \* \*